US008460157B2

(12) United States Patent
Tasaka et al.

(10) Patent No.: US 8,460,157 B2
(45) Date of Patent: Jun. 11, 2013

(54) TORQUE DOWN CONTROL APPARATUS AND METHOD FOR AUTOMOTIVE VEHICLE

(75) Inventors: Hajime Tasaka, Fuji (JP); Yutaka Tohyama, Kanagawa (JP); Masahiro Hamano, Numazu (JP)

(73) Assignee: Jatco Ltd, Fuji-shi (JP)

( * ) Notice: Subject to any disclaimer, the term of this patent is extended or adjusted under 35 U.S.C. 154(b) by 172 days.

(21) Appl. No.: 13/153,946

(22) Filed: Jun. 6, 2011

(65) Prior Publication Data

US 2012/0021870 A1   Jan. 26, 2012

(30) Foreign Application Priority Data

Jun. 7, 2010   (JP) .................. 2010-129774

(51) Int. Cl.
*B60W 10/04* (2006.01)
*B60W 10/10* (2006.01)

(52) U.S. Cl.
USPC ............................... 477/107; 701/85; 477/44

(58) Field of Classification Search
USPC ...................... 701/85; 477/44, 107
See application file for complete search history.

(56) References Cited

U.S. PATENT DOCUMENTS

| | | | | |
|---|---|---|---|---|
| 5,070,960 A | * | 12/1991 | Nobumoto et al. | 180/197 |
| 5,403,247 A | * | 4/1995 | Yagi | 477/107 |
| 6,023,647 A | * | 2/2000 | Saito et al. | 701/57 |
| 7,101,313 B2 | * | 9/2006 | Kresse et al. | 477/115 |
| 7,563,195 B2 | * | 7/2009 | Ota et al. | 477/107 |
| 7,614,977 B2 | * | 11/2009 | Fujii et al. | 477/107 |
| 2009/0157243 A1 | | 6/2009 | Kim | |

FOREIGN PATENT DOCUMENTS

| | | |
|---|---|---|
| JP | 62-265039 A | 11/1987 |
| JP | 7-317580 A | 12/1995 |
| JP | 09-242573 A | 9/1997 |
| JP | 10-122005 A | 5/1998 |
| JP | 11-091411 | 4/1999 |
| JP | 3517847 B2 | 2/2004 |
| WO | WO 2007/072175 A1 | 6/2007 |

* cited by examiner

*Primary Examiner* — Sherry Estremsky
(74) *Attorney, Agent, or Firm* — Foley & Lardner LLP

(57) ABSTRACT

In torque down control apparatus and method for an automotive vehicle, an upper limit value of a drive force of a prime mover is reduced to a predetermined value when a predetermined condition is established, the upper limit value of the drive force is increased at a predetermined speed to recover the upper limit value of the drive force from the predetermined value, the recovery is limited when an accelerator opening angle is smaller than a predetermined opening angle than a case where the accelerator opening angle is equal to or larger than the predetermined opening angle during the recovery of the upper limit value of the drive force, and the limitation is relieved when a vehicle speed is equal to or higher than a predetermined vehicle speed than a case where the vehicle speed is lower than the predetermined vehicle speed.

7 Claims, 5 Drawing Sheets

FIG.2

|  | L/B | H/C | R/B |
|---|---|---|---|
| 1ST SPEED | ◯ | × | × |
| 2ND SPEED | × | ◯ | × |
| BACKWARD (REVERSE) | × | × | ◯ |

TORQUE DOWN CONTROL APPARATUS AND METHOD FOR AUTOMOTIVE VEHICLE

BACKGROUND OF THE INVENTION (1) Field of the Invention

The present invention relates to torque down control apparatus and method for an automotive vehicle and particularly relates to the torque down control apparatus and method which reduce a drive torque by means of a dynamic power under a predetermined condition.

(2) Description of Related Art

A Japanese Patent No. 3517847 issued on Feb. 6, 2004 exemplifies a previously proposed torque down control apparatus in which, when an engine drive force is recovered by means of such a traction control that an engine drive force is suppressed in order for a slip quantity of drive wheels to become equal to a target slip quantity, an accelerator pedal is returned to an original no depression force application state (so-called, a release state or accelerator OFF state) in a midway through the recovery and, at this time, the recovery of the engine drive force is limited to a torque reduction direction.

The torque down control is useful not only during an execution of traction control but also in a case where an automotive vehicle is first traveled from a stopped state. In addition, the torque down control is carried out to prevent an abrupt recovery of the drive force when one of the following cases is eliminated. That is to say, the cases include a case where an interlock failure of an automatic transmission occurs, a case when the engine becomes stall with any one or more of frictional engagement elements released, and a case when a neutral failure occurs.

In the automatic transmission, clutches and brakes are provided in a transmission mechanism including gears as its rotary transmission elements and combinations of engagement and release of these elements achieve a plurality of shift stages. For example, if such a, so-called, interlock failure state that frictional engagement elements such as clutches and brakes are the combination of the engagement and release different from a normal case thereof occurs, the vehicle cannot move since a revolution output of the automatic transmission is not generated in spite of the fact that the revolution from the engine is inputted in the automatic transmission. A vehicle driver, in many cases, once returns the accelerator pedal to the no-depression force application state (accelerator OFF state) from the accelerator ON state and again depresses the accelerator pedal (accelerator ON state). Actually, this often eliminates the interlock and the vehicle, in many cases, becomes a movement enabled state (the vehicle can be traveled).

However, in a case where the vehicle driver again depresses the accelerator pedal (accelerator ON state), the vehicle often carries out an abrupt recovery of the drive force when the interlock is eliminated.

As a countermeasure of the occurrence of the abrupt recovery described above, it can be thought that, in a case of the interlock failure, such a torque down control that an engine torque limitation (or regulation) value is set which suppresses an upper limitation of the engine drive force, the engine drive force is gradually recovered in an increase direction, and the recovery of the engine drive force is limited to a torque decrease direction when the accelerator pedal is returned to no depression force application state (the release state).

SUMMARY OF THE INVENTION

However, in the above-described torque down control, in a case where the driver's depression and return operations on the accelerator pedal (accelerator ON and OFF) are repeated by a plurality of number of times, the recovery of the engine drive force is limited in the torque decrease direction is limited whenever the return is carried out and the delay occurs. Consequently, an unpleasant feeling (a sense of difference) is given to the vehicle driver (vehicular occupant) and driveability is worsened.

It is, hence, an object of the present invention to provide engine torque down control apparatus and method for an automotive vehicle which prevent the abrupt recovery of the engine drive force from the vehicle stopped state and which do not introduce the worsening of the driveability.

According to one aspect of the present invention, there is provided with a torque down control apparatus for an automotive vehicle, the vehicle limiting an upper limit value of a drive force of a prime mover thereof, comprising: a torque down section configured to reduce the upper limit value of the drive force to a predetermined value when a predetermined condition is established; and a torque down recovery control section configured to increase the upper limit value of the drive force at a predetermined speed to recover the drive force from the predetermined value, wherein the torque down recovery control section includes: a limiting section configured to limit the recovery when an accelerator opening angle is smaller than a predetermined opening angle than a case where the accelerator opening angle is equal to or larger than the predetermined opening angle during the recovery of the upper limit value of the drive force; and a limitation relieving section configured to relieve the limitation by means of the limiting section when a vehicle speed is equal to or higher than a predetermined vehicle speed than a case where the vehicle speed is lower than the predetermined vehicle speed.

According to another aspect of the present invention, there is provided with a torque down control method for an automotive vehicle, the vehicle limiting an upper limit value of a drive force of a prime mover thereof, comprising: reducing the upper limit value to a predetermined value when a predetermined condition is established; and increasing the upper limit value of the drive force at a predetermined speed to recover the upper limit value of the drive force from the predetermined value, wherein reducing the upper limit value of the drive force to the predetermined value includes: limiting the recovery when an accelerator opening angle is smaller than a predetermined opening angle than a case where the accelerator opening angle is equal to or larger than the predetermined opening angle during the recovery of the upper limit value of the drive force; and relieving the limitation when a vehicle speed is equal to or higher than a predetermined vehicle speed than a case where the vehicle speed is lower than the predetermined vehicle speed.

BRIEF DESCRIPTION OF THE DRAWINGS

FIG. 2 is a table representing a combination of an engagement of frictional engagement elements in an automatic transmission to which the torque down control apparatus shown in FIG. 1 is applicable.

DETAILED DESCRIPTION OF THE INVENTION

Figure 1:
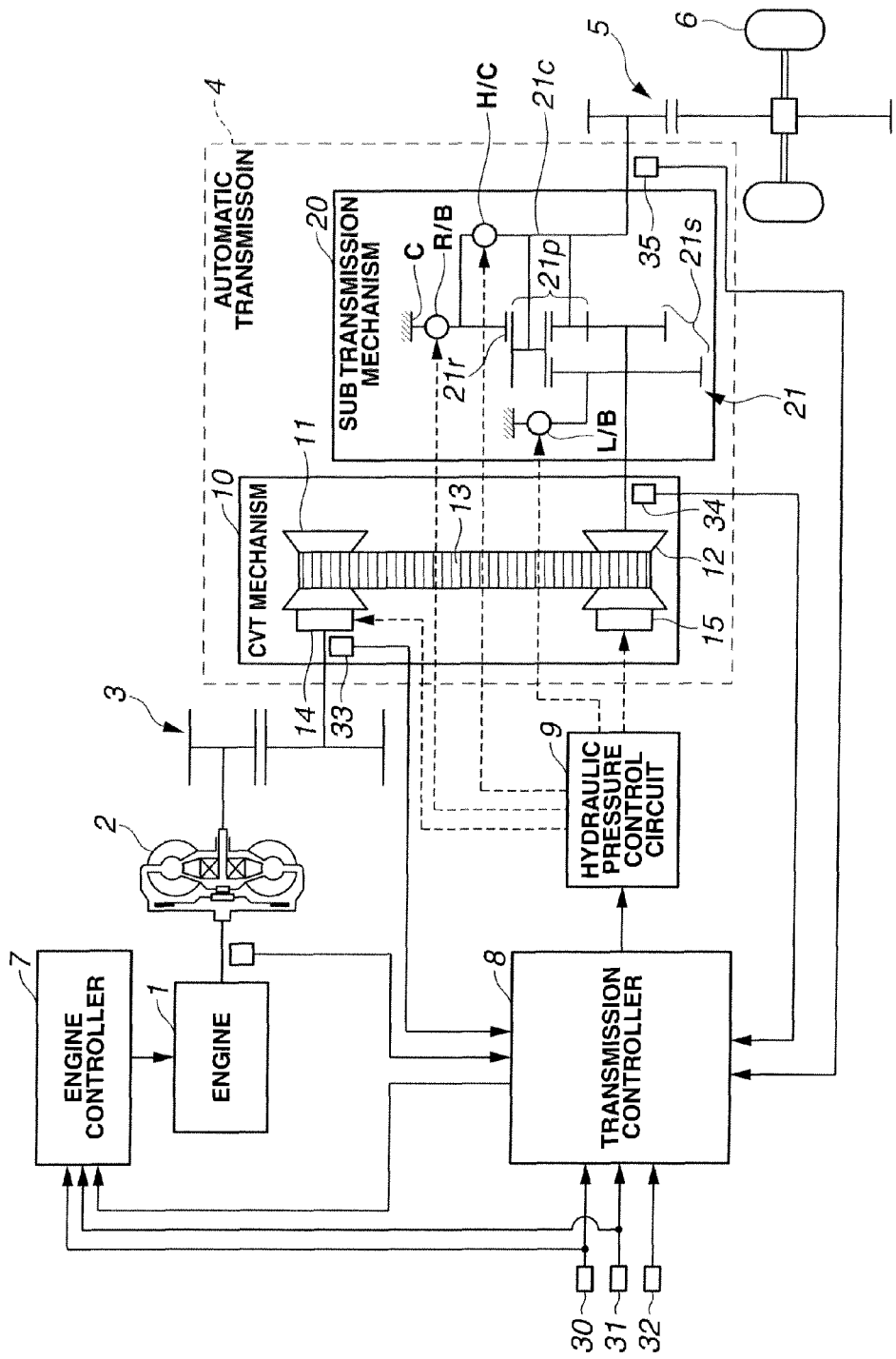
FIG. 1 is a system configuration view of an automotive vehicle to which a torque down control apparatus in a preferred embodiment according to the present invention is applicable.

Reference will, hereinafter, be made to the drawings in order to facilitate a better understanding of the present invention. In a preferred embodiment according to the present invention, a torque down control is carried out at a time of a vehicle stop when there is a possibility of an occurrence of an interlock failure in an automatic transmission. FIG. 1 is a system configuration of an automotive vehicle to which a torque down control apparatus in the preferred embodiment according to the present invention is applicable and, particularly, relates to the structure of the vehicle related to a power train of the vehicle.

An automatic transmission 4 with a lock-up clutch is sequentially connected to an engine 1 which serves as a dynamic power of the vehicle via a torque converter 2. An output of automatic transmission 4 is transmitted to road wheels 6 via a final drive gear mechanism 5. A working hydraulic pressure in torque converter 2 and automatic transmission 4 are controlled by means of a hydraulic pressure control circuit 9. Automatic transmission 4 includes a belt-type continuously variable transmission (CVT mechanism) 10 and an auxiliary (or sub) transmission mechanism 20 which is constituted by a combination of gears and frictional engagement elements.

CVT mechanism 10 includes: a primary pulley 11; a secondary pulley 12; and a V belt 13 which is wound on and bridged between first and second pulleys 11, 12. Primary pulley 11 is linked with an output axle of speed-reduction mechanism 3 and secondary pulley 12 is linked with an input axle of auxiliary transmission mechanism 20. Each of primary pulley 11 and secondary pulley 12 is constituted by a fixture truncated cone plate and a movable truncated cone plate disposed in a state in which a sheave surface thereof is opposed against this fixture truncated cone plate and formed with a V groove against fixture truncated cone plate. Hydraulic pressure supplied to hydraulic pressure cylinders 14, 15 which displace a corresponding one of the movable truncated cone plates and disposed on a rear surface of this movable truncated cone plate is controlled by a hydraulic pressure control circuit 9. Thus, a width of V groove is changed so that a contact radius with V belt 13 is varied and a transmission gear ratio (or a gear ratio) is unlimitedly varied. It should be noted that a hydraulic pressure passage is denoted by a dot line.

Auxiliary (sub) transmission mechanism 20 includes: a ravigneaux type planetary gear mechanism 21 disposed with a composite pinion 21p interposed between composite sun gear 21s coupled with an input axle thereof and a ring gear 21r; and a pinion carrier 21c coupled with an output axle thereof. The output axle of auxiliary transmission mechanism 20 provides the output axle of automatic transmission 4. Sun gear 21s is connected to a fixture side case C via a low brake L/B, carrier 21c being connected to ring gear 21r via a high clutch H/C. Ring gear 21r is connected to a casing C via a reverse brake R/B.

Low brake L/B, high clutch H/C, and reverse brake R/B which are frictional engagement elements are engaged and released according to hydraulic pressures supplied from hydraulic pressure control circuit 9, respectively. The combination of engagement and release shown in FIG. 2 achieves a forward-two-stage (first speed and second speed) and reverse-one-stage (reverse) automatic transmission. That is to say, the engagement of low brake L/B and the release of high clutch H/C achieve the forward second speed. In addition, only the engagement of reverse brake R/B achieves the backward travel (a reverse).

Engine 1 is controlled by means of an engine controller 7. Hydraulic pressure control circuit 9 is controlled by transmission controller 8. As a control input information, engine controller 7 inputs an accelerator opening angle from accelerator opening angle sensor 30 and an engine (revolution) speed from engine revolution sensor 31. Engine controller 7 controls a fuel supply quantity and an ignition timing in accordance with the accelerator opening angle and the engine speed and an output torque (an engine torque) on a basis of a request from transmission controller 8.

In addition to the same control input information in transmission controller 8, an accelerator opening angle from an accelerator opening angle from accelerator opening angle sensor 30 and an engine revolution speed (engine speed) from an engine speed (revolution) sensor 31 are inputted and a selection range signal by the vehicle driver from an inhibitor switch 32, a revolution signal from primary pulley revolution sensor 33, and a revolution signal of the transmission output axle from an output axle revolution sensor 35 are inputted to a pulse signal. It should be noted that the vehicle speed is determined according to the calculation from the revolution speed of the transmission output axle. It should be noted that a vehicle speed is determined through a calculation from the revolution speed of the output axle of transmission.

As is well known in transmission controller 8, a control signal is outputted to hydraulic pressure control circuit 9 to vary the transmission ratio in accordance with the accelerator opening angle and the vehicle speed depending upon the selected range, particularly, depending upon the forward range and so forth. For example, for auxiliary transmission mechanism 20, a first speed having a large transmission gear ratio is set at a time of a vehicular start. In addition, transmission controller 8 is set in a lock-up state in which a control signal to engage a lock-up clutch of torque converter 2 is outputted in a predetermined lock-up region on a basis of the transmission gear ratio and accelerator opening angle. It should be noted that the hydraulic pressure supply passage form hydraulic pressure control circuit 9 to the lock-up clutch is omitted in the drawings.

The torque down control procedure related to the torque down of engine 1 at the time of a re-start from an idling stop will be described below.

Figure 3:
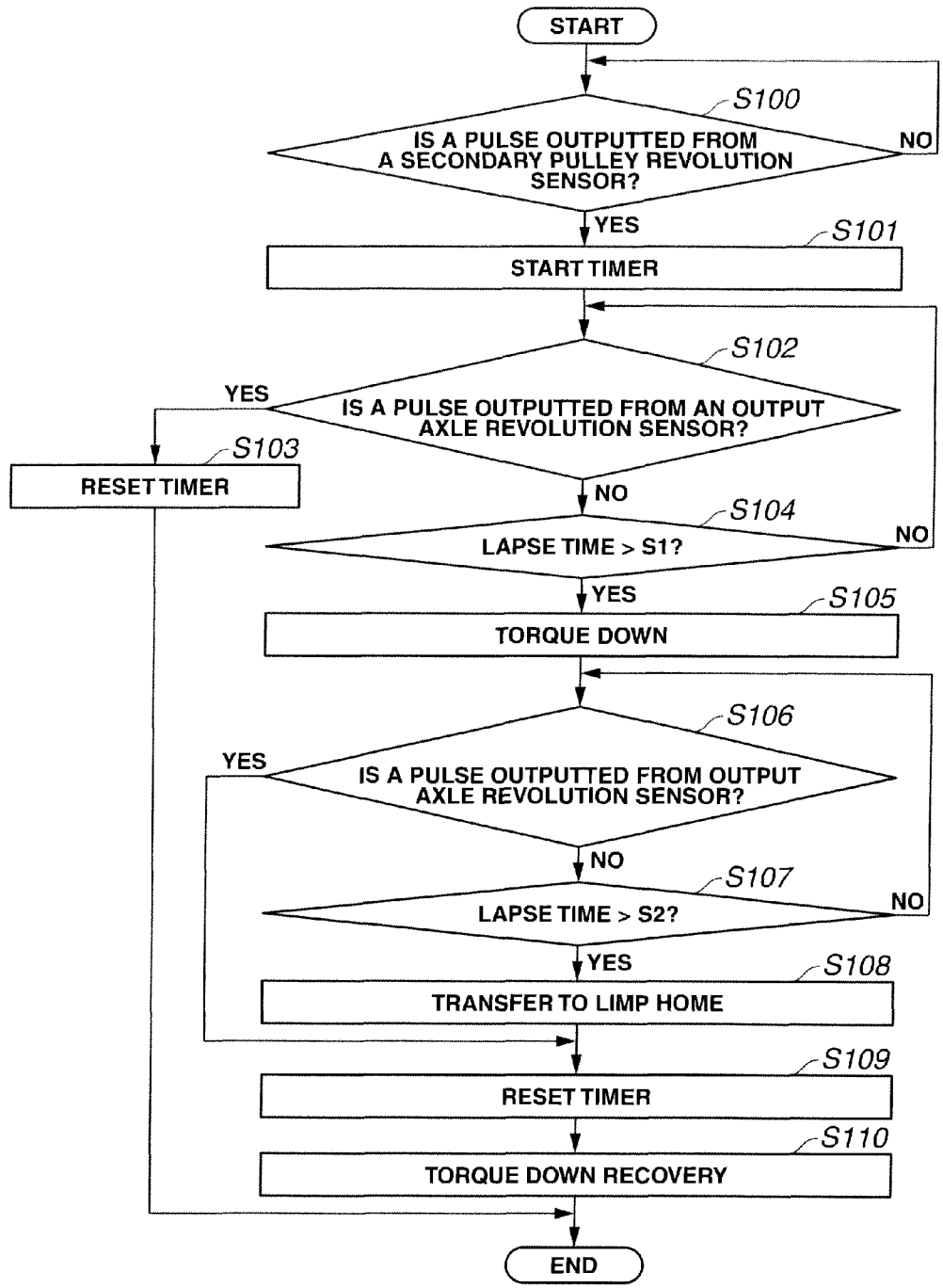
FIG. 3 is a main flowchart representing a stream of the torque down control.

FIG. 3 is a flowchart representing a control flow of transmission controller 8. Transmission controller 8 monitors the signals from secondary pulley revolution sensor 34 and output axle revolution sensor 35 even during the strop of the vehicle. At a step S100, transmission controller 8 determines whether a pulse is outputted by secondary pulley revolution sensor 34. Until engine 1 is restarted and its revolution is inputted to continuously variable transmission mechanism 10 and the pulse of secondary pulley revolution sensor 34 is outputted with secondary pulley 12 revolved, step S100 is repeated.

When the pulse is outputted from secondary pulley revolution sensor 34, the routine goes to a step S101. At a time t0, a timer built in transmission controller 8 is started. At the next step S102, transmission controller 8 checks to determine whether the pulse is outputted from output axle revolution sensor 35. There is a possibility that the interlock is generated in auxiliary transmission mechanism 20 from a viewpoint that the output axle is not revolved in spite of the fact that the revolution of secondary pulley 12 is not inputted to auxiliary transmission mechanism 20.

In this case, the routine goes to a step S104 to determine whether the timer value is larger than a predetermined time duration S1. If a lapse time is equal to or shorter than S1, the routine returns to a step S102. At step S102, transmission controller 8 repeats the check of the pulse output from output axle revolution sensor 35. Then, in a case where the interlock is eliminated for the time duration which is equal to or shorter than lapse time S1 and the pulse is outputted from output axle revolution sensor 35, the routine returns to step S102 to repeat the check of the pulse output from output axle revolution sensor 35. Then, the interlock is eliminated for the time duration equal to or shorter than lapse time of S1 and the pulse is outputted from output axle revolution sensor 35. In this case, the routine advances to a step S103 to reset the timer and, thereafter, the processing is ended.

On the other hand, if the lapse time is in excess of predetermined time duration S1 at step S104 with the determination of no output pulse from output axle revolution sensor 35, there is a high possibility of the occurrence of the interlock failure and the routine goes to a step S105. At step S105, transmission controller 8 outputs a request to reduce an engine torque regulation (limitation) value to a predetermined value for engine controller 7 so as to enter a phase of the torque down control.

Thereafter, at a step S106, transmission controller 8 checks to see whether the pulse is outputted from output axle revolution sensor 35. At a step S107, transmission controller 8 determines whether the timer indicates predetermined time duration S2 (time point S2) longer than S1. In a case where predetermined time duration S2 is set to a value longer than S1, the interlock is eliminated and the vehicle travel is started. However, since the engine torque regulation value is reduced, the unpleasant feeling due to the abrupt return of the drive force is not given by the vehicle driver. In this way, when the pulse is outputted from output axle revolution sensor 35, the routine goes from step S106 to step S109. At step S110, the recovery from the torque down is carried out at step S110.

On the other hand, in a case where the time is in excess of lapse time S2 with no pulse output from output axle revolution sensor 35, automatic transmission controller 8 definitely determines that the interlock failure occurs and the routine goes from step S107 to a step S108. At step S108, transmission controller 8 transfers control to the limp home mode in which a travel to a vehicle service shop or to a repair factory is enabled.

It can be thought that, in a case where the interlock occurs in a state in which high clutch H/C cannot be released although only low brake L/B should be engaged at a time of engine start from the stopped state of the vehicle. Thus, in the limp home mode, low brake L/B is released and auxiliary transmission mechanism 20 is set to the second-speed (2-nd speed) state. After the transfer of the limp home mode, the timer is reset at a step S109 and a recovery process from the torque down is executed at a step S110. After the end of recovery processing, the control at the present routine is ended.

Figure 4:
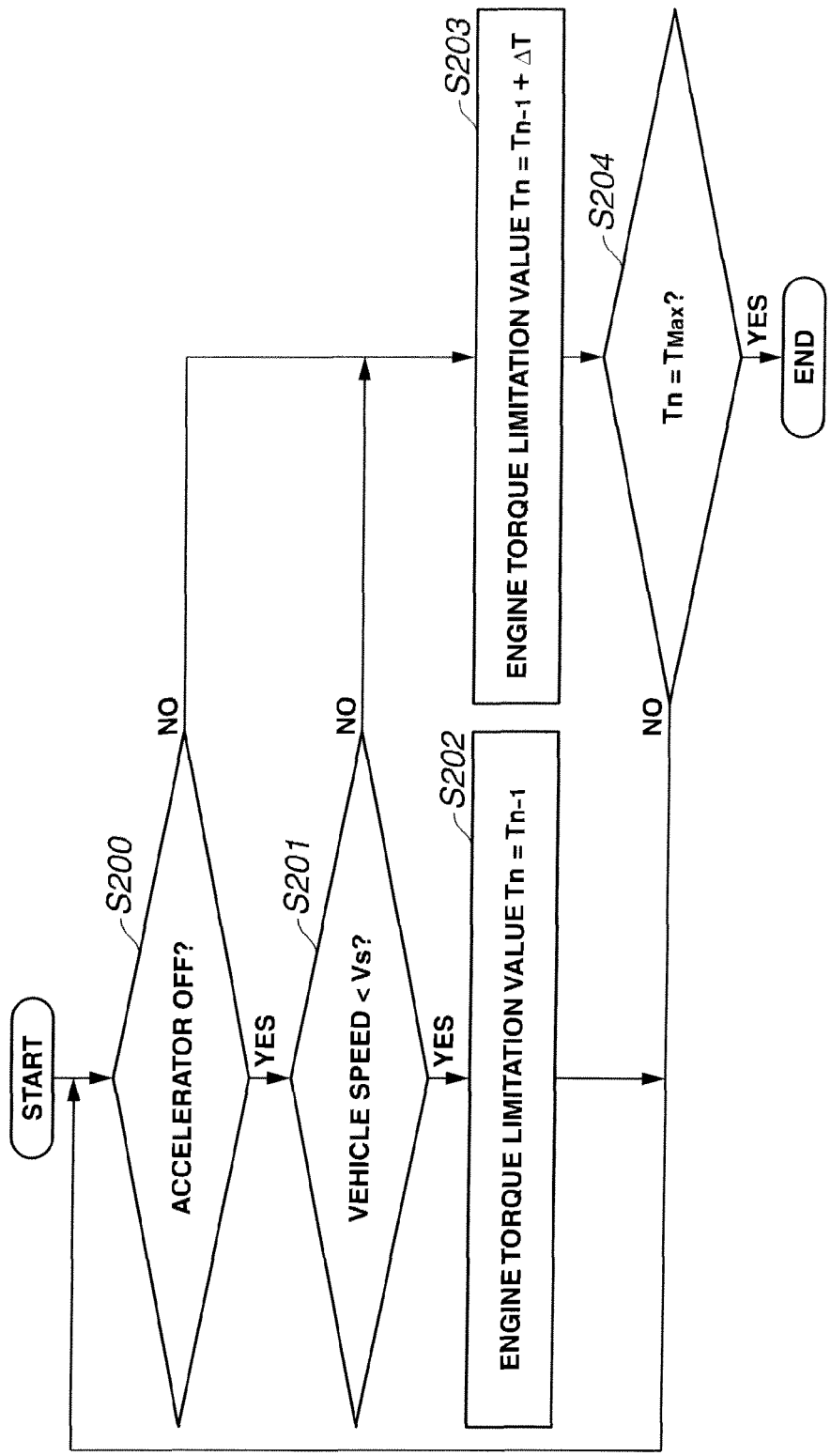
FIG. 4 is a flowchart representing details of a torque down recovery.

FIG. 4 is a flowchart representing details of the torque down recovery at step S110. A basic recovery of the torque down is to increase an engine torque limitation value at a constant gradient corresponding to a lapse time (namely, gradually) in order not to be linked to the abrupt recovery of the drive force.

At a step S200, (automatic) transmission controller 8 determines whether the accelerator pedal is in an off state (accelerator opening angle=0 or accelerator OFF). Then, if accelerator pedal is in an off state (accelerator opening angle=0), the routine goes to a step S201. At step S201, (automatic) transmission controller 8 checks to see whether the vehicle speed derived on a basis of the output of output axle revolution sensor 35 is lower than a predetermined reference value Vs. With a detection limit of output axle revolution sensor 35 taken into consideration, the vehicle speed having a degree at which it can be determined that the vehicle is traveling (not stopped) is set as a reference value Vs and a state in which the vehicle speed is lower than reference value Vs is called a vehicle stop corresponding state.

When the vehicle speed is in a state in which the stop vehicle corresponding state occurs (vehicle speed<Vs), at a step S202, engine torque limitation value $T_n$ is held at a value $T_{n-1}$ at a previous routine. Thereby, the predetermined value of the engine torque limitation value if the present routine is at a first flow after the torque down recovery and the engine torque limitation value is maintained at the time of the accelerator pedal off state (accelerator OFF state) if the present routine is in a midway through after the increase start.

Suppose that the recovery from the torque down is continued even if an accelerator OFF state occurs. If the accelerator opening angle is changed as accelerator ON→OFF→ON, the engine torque is made small when the accelerator pedal is first in the ON state (accelerator ON). The engine torque is large at the time of the second occurrence of the accelerator ON even if the same accelerator opening angle as the first occurrence thereof is brought out. Thus, this does not bring the abrupt drive force recovery and there is a possibility of an occurrence of the unpleasant feeling. Thus, the engine torque limitation value is not increased. Then, the routine returns to step S200.

If (automatic) transmission controller 8 determines that the accelerator ON (accelerator opening angle>0) occurs at step S200, the routine goes to a step S203. At step S203, automatic transmission controller 8 adds a constant increment ΔT to engine torque limitation value $T_{n-1}$ at the previous routine ($T_n=Y_{n-1}+\Delta T$). Thus, the engine torque limitation value is increased at the constant gradient. In addition, if the vehicle speed is not in the vehicle stop corresponding state (vehicle speed<Vs) at step S201, the routine goes to step S203.

Thereafter, the routine goes from step S203 to step S204 in which (automatic) transmission controller 8 determines whether the present engine torque limitation value $T_n$ has reached to a maximum value $T_{MAX}$. If $T_n \neq T_{max}$ (No), the torque down recovery processing is returned to step S200. If $T_n=T_{max}$ (Yes), the torque down recovery processing is ended.

According to the present torque down control procedure, even if such a series of operations as the repetition of the depression of the accelerator pedal with the accelerator pedal returned to the accelerator OFF state are carried out, the engine torque limitation value is held without decrease for each of the accelerator OFF state. Hence, the recovery can be made earlier. However, during the accelerator OFF state, the engine torque limitation value is not increased. Hence, for example, the engine torque at the time of second occurrence accelerator pedal depression is suppressed in the same way as the first occurrence accelerator pedal depression before the accelerator OFF state. Thus, in spite of the fact that the same accelerator opening angle depression, such a sense of difference that the torque is increased is not given by the vehicle driver.

Figure 5:
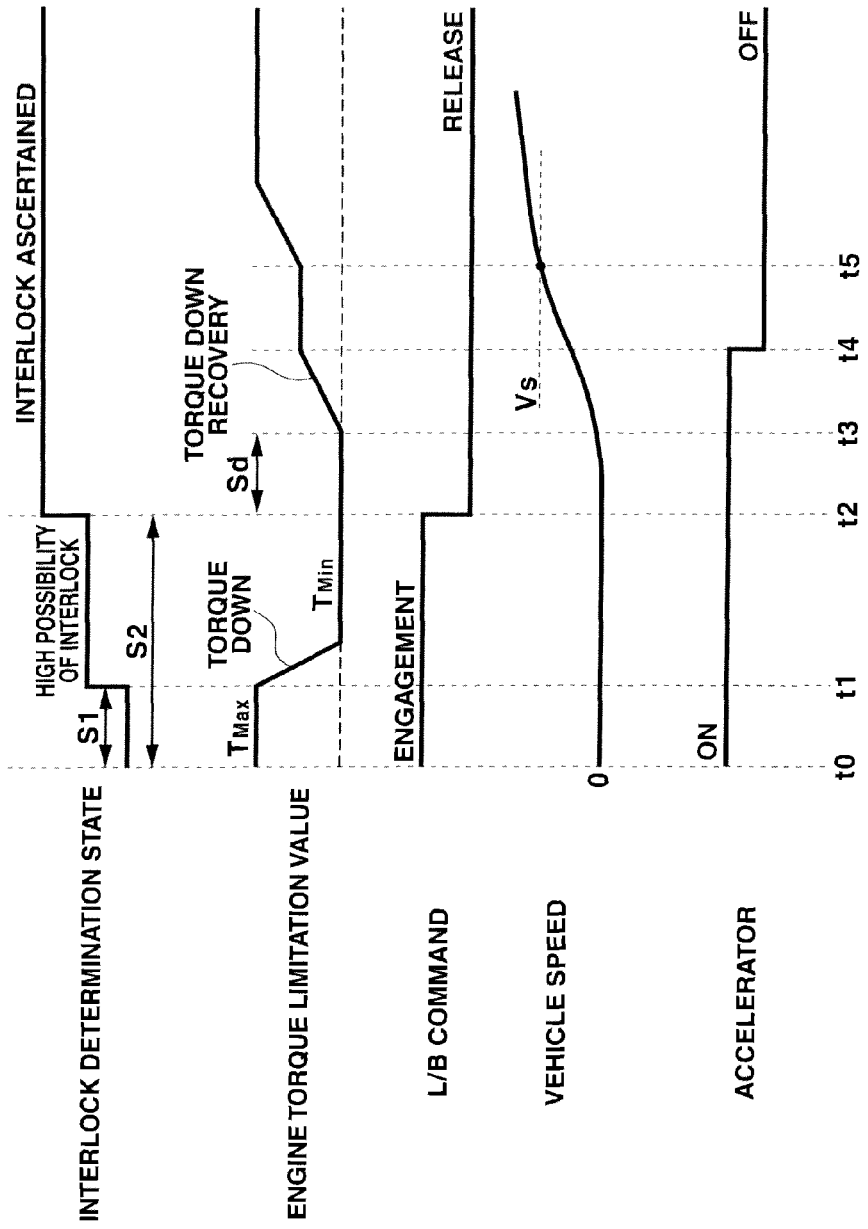
FIG. 5 is a timing chart representing a variation in variables in a torque down control executed in the torque down control apparatus shown in FIG. 1.

FIG. 5 shows a timing chart representing a variation in related variables in a case where control is transferred to the limp home mode.

That is to say, when a timer is started at a time point of t0 and a pulse is not outputted from output axle revolution sensor 35 until a time point t1 to which time duration S1 has elapsed, there is a possibility of the interlock failure. Hence, control enters the engine torque down control so that engine torque limitation value is reduced to predetermined value $T_{MIN}$. Thereafter, automatic transmission controller 8 determines whether the pulse is outputted from output axle revolution sensor 35. In a case where no pulse output is found although waiting until a time point of t2 at which a time duration of S2 (S1<S2) has elapsed, automatic transmission controller 8 definitely determines that the interlock failure has occurred and outputs a release command of low brake L/B to hydraulic pressure control circuit 9 in order to transfer control to the limp home mode.

During this time, the accelerator pedal has been depressed with the intention of start (accelerator ON) but the vehicle is in the vehicle stop state (vehicle speed=0). When a predetermined delay time Sd set as a time duration for low brake L/B to actually be released has passed to become a time point t3, the interlock is eliminated and the increase of the vehicle speed is started. At the same time, the torque down recovery is started and the engine torque limitation value is increased at the constant gradient.

Furthermore, in a midway through the increase in the engine torque limitation value during the torque down recovery, the accelerator pedal is returned (accelerator OFF) before the vehicle speed has reached to Vs, as in a case at a time point t4. In this case, the instantaneous engine torque limitation value at that time point is held until a time point t5 at which the vehicle speed has reached to Vs. Thereafter, the vehicle speed is again increased toward the maximum value at the same gradient as before the holding thereof.

In this embodiment, engine 1 corresponds to a prime mover according to the present invention. A functional part of automatic transmission controller 8 executing processes of steps S100 through S105 in the flowchart of FIG. 3 corresponds to torque down means (a torque down section) according to the present invention and the engine torque limitation value corresponds to an upper limit value of the drive force (exerted by the prime mover).

The functional part of automatic transmission controller 8 executing steps of S200 through S204 in the flowchart of FIG. 4 corresponds to torque down recovery control means (a torque down recovery control section), particularly, the flow branching from step S201 to step S202 corresponds to limiting means (a limiting section), and the flow branched from step S201 to step S203 corresponds to limitation relieving means (a limitation relieving section).

As described hereinabove, transmission controller 8 determines that there is a possibility of the occurrence of the interlock when no pulse is outputted by output axle revolution sensor 34 for predetermined time duration (S1) although secondary pulley revolution sensor 34 has outputted the pulse and reduces the engine torque limitation value to predetermined value $T_{MIN}$ to perform the torque down. Then, at the time at which the recovery from the torque down, the engine torque limitation value is increased by $\Delta T$ whenever the process shown in FIG. 3 is executed.

Then, when the accelerator opening angle becomes zero (accelerator OFF state) in the midway through the recovery in which the engine torque limitation value is increased, the engine torque limitation value at that time point is held. Thus, the recovery is limited than the accelerator ON state and, when the vehicle speed is equal to or higher than Vs although the accelerator OFF state, this limitation is relieved and the engine torque limitation value is increased.

When the vehicle speed is equal to or faster than the predetermined value (Vs), the vehicle driver does not easily give the sense of difference even if the recovery from the torque down is carried out regardless of the accelerator ON or OFF state.

For example, in a case where the torque down control is carried out in order to suppress the abrupt recovery of the drive force, what the driver particularly gives the sense of difference is that the abrupt recovery of the drive force when the accelerator ON (the accelerator pedal is depressed) is carried out after the accelerator OFF (the accelerator pedal is not depressed) at the time of the vehicle stop. Whereas, at the time at which the depression on the accelerator pedal is again carried out after the return of the accelerator pedal to the no-depression state (accelerator OFF), the engine torque becomes larger than the time immediately before the accelerator pedal return to the no depression state. Even this case, the vehicle has already traveled. Therefore, the vehicle driver does not easily give the sense of difference.

Therefore, in the preferred embodiment, the recovery of the torque down with the limitation relieved when the vehicle speed is equal to or higher than the predetermined value (predetermined vehicle speed) so that the recovery from the torque down is made earlier. Hence, while the giving of the sense of difference to the vehicle driver is suppressed, the worsening of the driveability is prevented due to the delay of the recovery.

In addition, the engine torque limitation value is held at the time of the accelerator OFF state. For example, as compared with a comparison example in which the engine torque limitation (regulation) value is again reduced at the time of the accelerator OFF state, the recovery from the torque down can be made earlier. Furthermore, in the control of the comparative example, the engine torque is made different at the first occurrence of the accelerator depression (accelerator ON) and at the second occurrence of the accelerator depression (accelerator ON) when the accelerator (pedal) is operated (depressed) in the ON-OFF-ON operation. Thus, there is a high possibility that the vehicle driver gives the sense of difference (it should be noted that the sense of difference means the unpleasant feeling). However, in the preferred embodiment, the same engine torque as the first accelerator depression immediately before the accelerator OFF is resulted at the time of the second occurrence accelerator pedal again depression. Thus, this does not introduce the sense of difference.

Since, in the preferred embodiment, the torque down is carried out when there is a possibility of the interlock during the vehicle stop and the recovery limitation is relieved and the engine torque limitation value is increased. Hence, the abrupt recovery of the drive force from the vehicle stopped state can positively be suppressed.

It should be noted that, as the preferred embodiment, the present invention is applicable to the automatic transmission mounted vehicle with the engine as the prime mover. However, the present invention is not limited to this and the present invention is applicable to an electric vehicle using, for example, an electric motor as the prime mover.

Then, in order to prescribe the upper limit value of the drive force of the prime mover in the torque down control, the engine torque limitation value is set and a request not to output the engine torque larger than the engine torque limitation value is issued for the engine controller. Alternatively, the upper limit value of the drive force may be limited by the decrease of the engine torque by a predetermined quantity in accordance with the accelerator opening angle. In addition, as the automatic transmission, the continuously variable transmission with the auxiliary transmission mechanism is exemplified. However, the present invention is applicable to, for example, a stepped geared automatic transmission.

Furthermore, as a predetermined condition to perform the torque down, there is a high possibility of the occurrence of the interlock of the automatic transmission. However, the present invention is not limited to this. The predetermined condition may be set in accordance with an arbitrary scene requiring the drive force reduction such as when the determination of occurrence in a neutral failure is made, when the determination of occurrence in an engine stall state is made, and so forth.

In addition, the interlock state of the automatic transmission is determined from such a condition that the output axle revolution sensor does not output the pulse although the secondary pulley revolution sensor outputs the pulse. For example, the present invention is applicable to the determination of the interlock from the relationship between the input torque to the automatic transmission and the vehicle speed.

The increase in the upper limit value of the drive force indicates the increase in the engine torque limitation value at the constant gradient. However, the present invention is not limited to this. For example, the engine torque limitation value may be increased at the increase rate in accordance with the accelerator opening angle. In this way, the gradual recovery from the torque down state may be carried out.

It should be noted that the recovery from the torque down control is limited by holding the engine torque limitation value at a time of the accelerator OFF state (accelerator pedal return to the no-depression state). However, the recovery from the torque down control may be limited as compared with the accelerator ON state. For example, the increase gradient of the engine torque limitation value at the time of accelerator OFF may be made small when the accelerator OFF state occurs. Or alternatively, the engine torque limitation value may be decreased when the accelerator OFF state occurs. Even if these cases occur, the limitation thereof is relieved when the vehicle speed is equal to or higher than the predetermined (vehicle speed) value so that the recovery from the torque down is made earlier and the sense of difference is not given to the vehicle driver. At this time, the present invention can prevent such a situation in which that the recovery of the engine torque is delayed so that the driveability becomes worsened.

In this embodiment, the predetermined value of the vehicle speed as the condition to relieve the limitation of the recovery from the torque down is reference value Vs to the degree such that the vehicle can be determined to be travelling with a detection limit of the output axle revolution sensor taken into consideration. However, the present invention is not limited to this. The predetermined value of the vehicle speed may be set by empirically deriving strictly the vehicle speed which does actually not give the vehicle driver the sense of difference even if the limitation is relieved.

Therefore, the vehicle speed may be derived from the ordinary vehicle speed sensor of the type in which the vehicle speed is derived on a basis of the pulse signal from output axle revolution sensor 35 or may be derived from the calculation of the engine speed and the gear ratio, or may be derived from the output value of an acceleration sensor or from a slip quantity of a torque converter. The vehicle speed may be detected with various kinds of means. Hence, the vehicle speed according to the present invention may be derived from any kind of sensors.

In this embodiment, when the recovery limitation (holding) is relieved even though the accelerator OFF state at the vehicle speed equal to or higher than the predetermined vehicle speed irrespective of the accelerator ON or OFF, the increase gradient of the engine torque limitation value is the same as before the holding. However, the present invention is not limited to this. For example, the increase gradient may be different before the holding.

Or alternatively, the increase gradient of the engine torque limitation value may be set to be larger than a case where the vehicle speed is slower than the predetermined vehicle speed when the vehicle speed is equal to or higher than the predetermined vehicle speed regardless of whether the accelerator opening angle is ON state or OFF state. If the recovery from the torque down in accordance with the vehicle speed can be made earlier, various forms of the recovery limitation relieving can be adopted.

This application is based on a prior Japanese Patent Application No. 2010-129774 filed in Japan on Jun. 7, 2010. The entire contents of this Japanese Patent Application No. 2010-129774 are hereby incorporated by reference. Although the invention has been described above by reference to certain embodiments of the invention, the invention is not limited to the embodiments described above. Modifications and variations of the embodiments described above will occur to those skilled in the art in light of the to above teachings. The scope of the invention is defined with reference to the following claims.

What is claimed is:

1. A torque down control apparatus for an automotive vehicle, the vehicle limiting an upper limit value of a drive force of a prime mover thereof, comprising: a torque down section configured to reduce the upper limit value of the drive force to a predetermined value when a predetermined condition is established; and a torque down recovery control section configured to increase the upper limit value of the drive force at a predetermined speed to recover the drive force from the predetermined value, wherein the torque down recovery control section includes: a limiting section configured to limit the recovery when an accelerator opening angle is smaller than a predetermined opening angle than a case where the accelerator opening angle is equal to or larger than the predetermined opening angle during the recovery of the upper limit value of the drive force; and a limitation relieving section configured to relieve the limitation by means of the limiting section when a vehicle speed is equal to or higher than a predetermined vehicle speed than a case where the vehicle speed is lower than the predetermined vehicle speed.

2. The torque down control apparatus for the automotive vehicle as claimed in claim 1, wherein the limiting section limits the recovery from the torque down by holding the upper limit value of the drive force at a time point at which the accelerator opening angle becomes equal to or smaller than the predetermined value.

3. The torque down control apparatus for the automotive vehicle as claimed in claim 1, wherein the torque down section reduces the upper limit value of the drive force when the predetermined condition is established during a stop of the vehicle and the limitation relieving section relieves the limitation by means of the limiting section when the vehicle is not stopped than the case where the vehicle is stopped.

4. The torque down control apparatus for the automotive vehicle as claimed in claim 1, wherein the vehicle is equipped with an automatic transmission including a continuously variable transmission mechanism whose primary pulley is connected with an engine and an auxiliary transmission mechanism whose input axle is connected with a secondary pulley and whose output axle is connected with road wheels of the vehicle via a final differential gear mechanism and wherein the predetermined condition is that a pulse is outputted from a secondary pulley revolution sensor configured to detect a revolution of the secondary pulley of the continuously variable transmission but no pulse is outputted from an output axle revolution sensor configured to detect the revolution of the output axle of the auxiliary transmission mechanism for a predetermined time duration.

5. The torque down control apparatus for the automotive vehicle as claimed in claim 4, wherein the upper limit value of the prime mover is an engine torque limitation value and wherein the limiting section limits the recovery of the engine torque limitation value from the torque down by holding the engine torque limitation value ($T_n = T_{n-1}$) at the time point at which the accelerator opening angle value is smaller than the predetermined opening angle.

6. The torque down control apparatus for the automotive vehicle as claimed in claim 4, wherein the limit relieving section adds a constant increment ($\Delta T$) to a previous engine torque limitation value ($T_{n-1}$) to relieve the limitation by the limiting section.

7. A torque down control method for an automotive vehicle, the vehicle limiting an upper limit value of a drive force of a prime mover thereof, comprising: reducing the upper limit value to a predetermined value when a predetermined condition is established; and increasing the upper limit value of the drive force at a predetermined speed to recover the upper limit value of the drive force from the predetermined value, wherein reducing the upper limit value of the drive force to the predetermined value includes: limiting the recovery when an accelerator opening angle is smaller than a predetermined opening angle than a case where the accelerator opening angle is equal to or larger than the predetermined opening angle during the recovery of the upper limit value of the drive force; and relieving the limitation when a vehicle speed is equal to or higher than a predetermined vehicle speed than a case where the vehicle speed is lower than the predetermined vehicle speed.

* * * * *